H. YOUNG.
Coffee Pot.
No. 45,787.           Patented Jan'y 3, 1865.
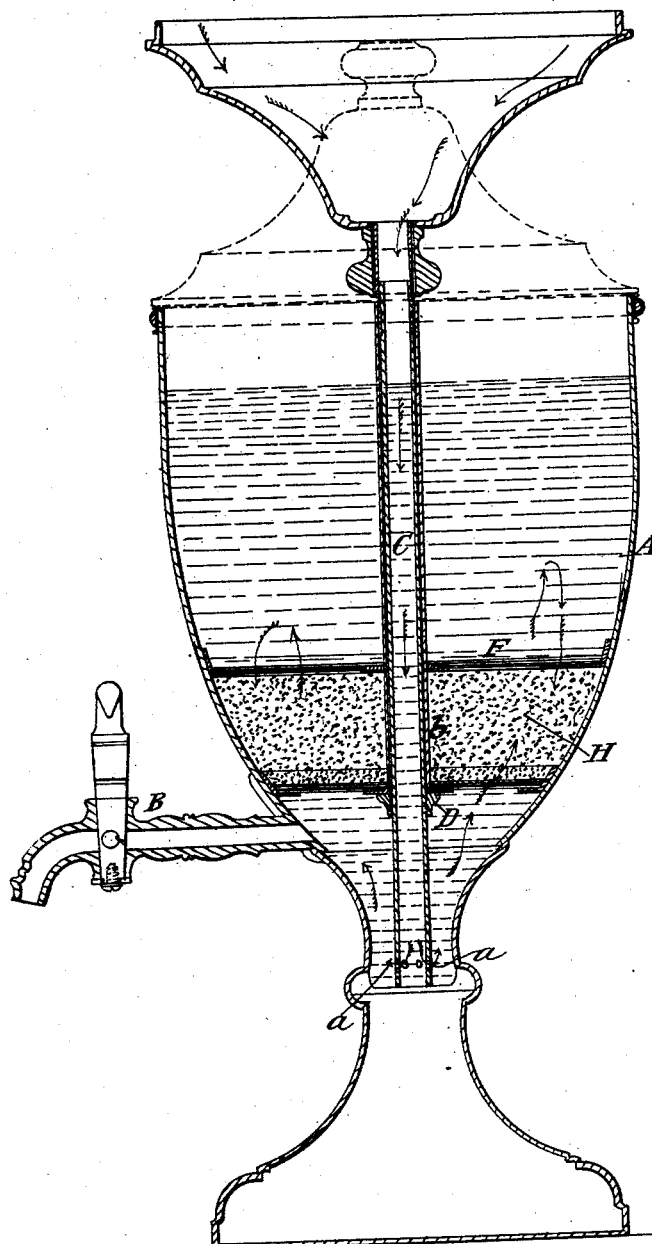
Witnesses:
Inventor:
Hiram Young

UNITED STATES PATENT OFFICE.

HIRAM YOUNG, OF NEW YORK, N. Y.

IMPROVEMENT IN COFFEE-POTS.

Specification forming part of Letters Patent No. 45,787, dated January 3, 1865; antedated December 11, 1861.

*To all whom it may concern:*

Be it known that I, HIRAM YOUNG, of the city, county, and State of New York, have invented a new and Improved Coffee-Pot; and I do hereby declare that the following is a full, clear, and exact description of the same, reference being had to the annexed drawing, making a part of this specification, said drawing being a vertical central section of my invention.

This invention relates to a coffee-pot of that class in which the coffee is made by leaching or percolation; and it consists in so arranging certain parts, hereinafter fully described, that the hot water will be forced upward through the ground coffee and then again passed down through it before being drawn for use, thereby insuring the extraction of all the strength from the coffee and by a very simple arrangement of means.

To enable those skilled in the art to fully understand and construct my invention, I will proceed to describe it.

A represents the body of the coffee-pot, which may be of any suitable form and provided with a faucet, B, at its lower end. Within the body A there is secured a vertical tube, C, said tube extending from the bottom to the top of the body, and perforated at its lower end, as shown at *a*. On the tube C, near its lower end, there is secured a collar or boss, D, which serves as a support for circular strainer E. This strainer may be constructed of wire-cloth, in the usual way, and it fits snugly in the body A. The strainer E has a central hub, *b*, attached, which encompasses the tube C and serves as a support for a strainer, F, which also fits snugly in the body A, the edges of both strainers being in contact with the inner surface of the body. On the upper end of tube C a screw-thread is cut.

G is the top of the coffee-pot, which has an aperture at its apex, with an internal screw cut in it. The top G, when inverted, forms a cup or funnel of considerable capacity, as shown in the drawing.

The device is used as follows: The ground coffee H is placed between the two strainers, E F, and the top G is inverted and screwed on the top of the tube C. The faucet B is closed and the hot water poured into the inverted top G, the water descending in tube C, passing through the apertures *a a* at its bottom, and then forced upward by static pressure through the ground coffee H and into the body A above the upper strainer, F, the coffee being leached by the passage of the water through it.

When the requisite amount of water is poured into the tube C, the top G is unscrewed from top C and placed in proper position on the body A, and the liquid coffee is drawn from faucet B, the liquid descending down through the ground coffee H. All the liquid, it will be seen, with the exception of the small quantity in the lower part of body A, below strainer E, and in the tube C, will pass twice through the ground coffee, and consequently the coffee will have all its strength extracted from it.

I do not confine myself to the exact position of the tube C within the body A, although the central position, as herein described, would be preferable.

The device is extremely simple and may be used by any one in a proper manner to insure the making in an economical manner of good coffee.

Having thus described my invention, what I claim as new, and desire to secure by Letters Patent, is—

1. The combination of the two strainers E F, tube C, and faucet B, arranged with the body A, substantially as and for the purpose set forth.

2. Constructing the top or cover G of the coffee-pot with an opening at its apex to admit of the inserting of the top and its attachments to the tube C, to serve the purpose of a funnel, as described.

HIRAM YOUNG.

Witnesses:
M. M. LIVINGSTON,
LEWIS A. TUCKER.